March 5, 1957   L. J. CRAIG   2,784,324
D.-C. MULTIPLIER EMPLOYING MAGNETIC AMPLIFIER
Filed July 6, 1954   2 Sheets-Sheet 1

INVENTOR.
LEONARD J. CRAIG,
BY Henry Heyman
ATTORNEY.

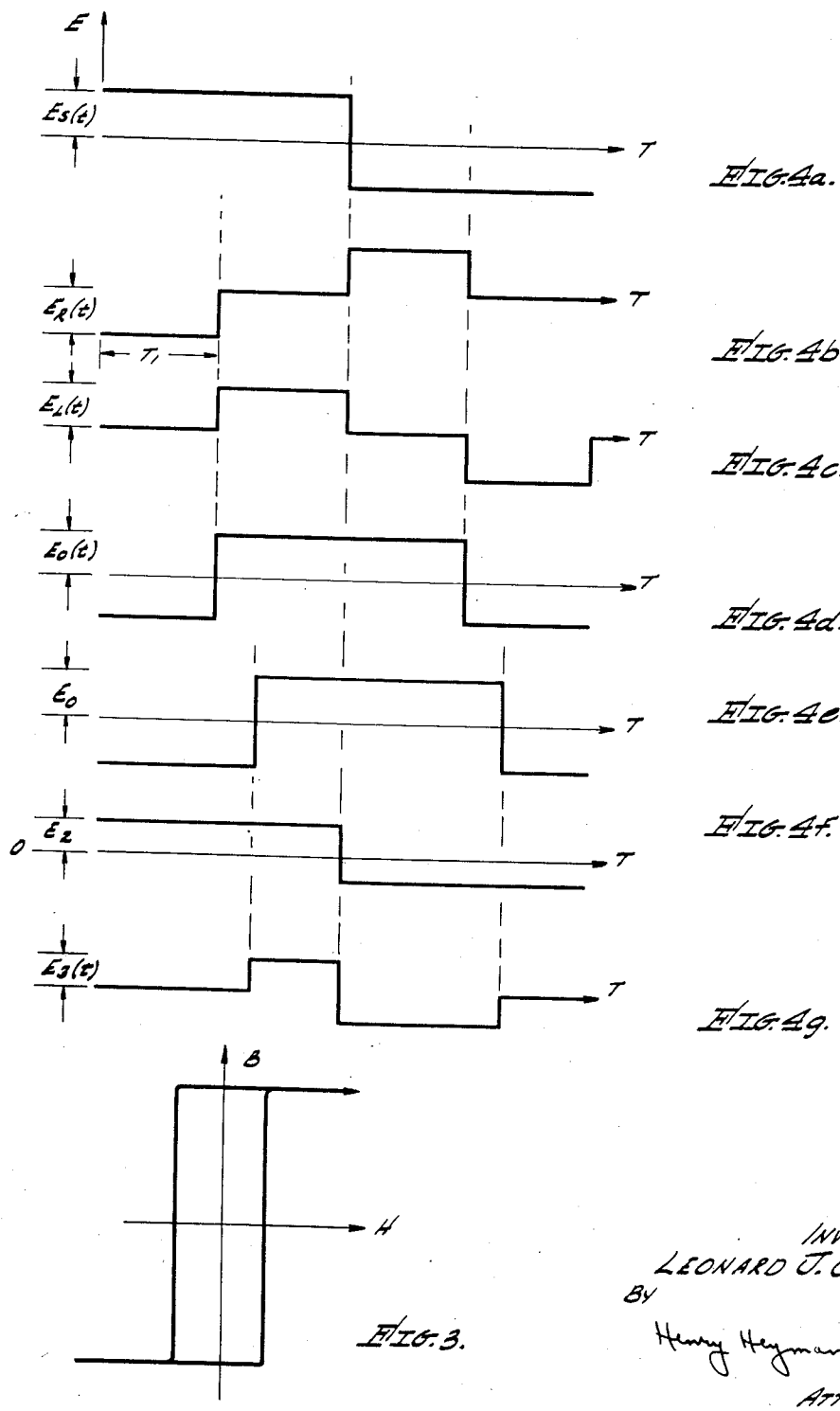

United States Patent Office 2,784,324
Patented Mar. 5, 1957

2,784,324

D.-C. MULTIPLIER EMPLOYING MAGNETIC AMPLIFIER

Leonard J. Craig, Beverly Hills, Calif., assignor to Hughes Aircraft Company, Culver City, Calif., a corporation of Delaware Application July 6, 1954, Serial No. 441,287

6 Claims. (Cl. 307—72)

This invention relates to signal measuring systems, and more particularly to direct-current (D.-C.) multipliers, wherein two D.-C. signals, each representative of a variable, are converted into an alternating waveform whose amplitude is proportional to the first variable, whose phase relative to a carrier period is proportional to the second variable, and whose average value is proportional to the product of the two variables.

Where it is desirable to multiply two variables, each variable being represented by a D.-C. signal, it is customary to convert the D.-C. signals into representative alternating current (A.-C.) quantities to make use of more stable A.-C. amplifiers. To accomplish this, locally generated rectangular waves are operated upon by the variables so that the amplitude of the waves is made proportional to one of the variables; the relative phase with respect to the generator period is made a function of the other variable, hence the average, or D.-C. component of the resultant alternating waveform, is proportional to the product of the two variables. The device which accomplishes this desired result must be extremely stable so that the amplitude of the representative alternating current wave form will always be proportional to the amplitude of one D.-C. quantity. It also must be capable of accurately controlling the phase of the alternating waveform so that said phase will always be directly proportional, with respect to the carrier, to the amplitude of the other D.-C. quantity.

Present D.-C. multipliers employ electro-mechanical choppers or vibrators as one means for converting the D.-C. signal into an alternating voltage. Mechanical failures and wide ranges of operating temperatures have a deleterious effect in the performance of such choppers and limit their operating life. Another type of D.-C. multiplier employs a servo-motor where one variable is a shaft rotation and is proportional to the D.-C. signal input to the stator. An inherent defect of this system is the slow time response of the servo-controlled variable because of the inertia of the motor's armature.

The present invention comprises a rectangular wave generator or source, wherein the output of the source and a first varying D.-C. signal are applied to a phase shifter. The phase shifter comprises a magnetic amplifier as means for shifting the phase of the source frequency so that the phase shift is directly proportional to the first D.-C. signal. The output of the source and a second D.-C. signal are applied to a bidirectional modulator, the second D.-C. signal modulating the rectangular wave so that its amplitude is directly proportional to the second D.-C. signal. The output of the phase shifter is then utilized as the demodulator carrier for gating the output of the bidirectional modulator to obtain a resultant alternating waveform. The first D.-C. signal will control the duration of the resultant waveform with respect to the period of the source rectangular waves, and the second D.-C. signal controls its amplitude. The voltage-time area under the resultant waveform and thus its average or D.-C. component, represents the product of the two D.-C. signals.

It is therefore an object of this invention to provide an improved D.-C. multiplier to convert two direct current quantities, each representing a variable, into a representative alternating current waveform.

It is a further object of this invention to provide a D.-C. multiplier employing magnetic amplifier means to produce an alternating waveform whose duration is controlled by a first D.-C. signal, and whose amplitude is controlled by a second D.-C. signal, and whose average value represents the product of both signals.

A still further object of this invention is to provide a multiplying system containing a stable magnetic amplifier which can accurately control the phase of a timing alternating voltage.

Another object of this invention is to provide a D.-C. multiplying system that is dependable over a wide range of temperatures and has a response time substantially better than those of presently available servo-motors.

The above and other objects and advantages of the invention will become apparent from the following description taken in conjunction with the accompanying drawings made a part of this specification. In the drawings:

Fig. 3 is a graph showing a magnetization curve of materials employed in a certain portion of the circuit arrangement of Fig. 2; and Figs. 4a–4g are graphs of waveforms useful in the explanation of the operation of the circuit arrangement shown in Fig. 2.

Figure 1:
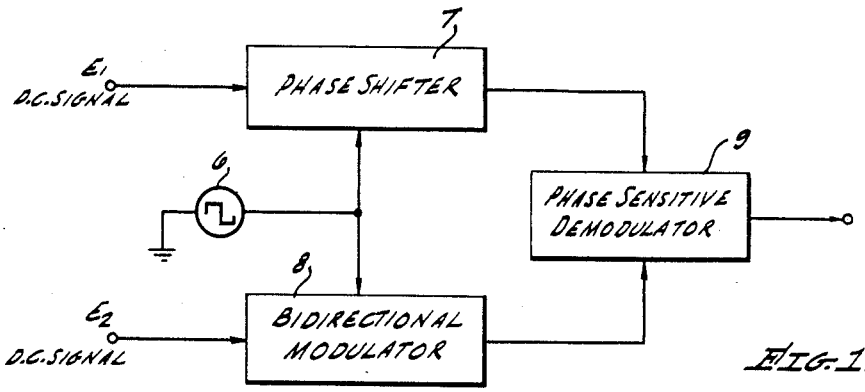
Fig. 1 is a block diagram of an improved D.-C. multiplying system in accordance with this invention.

Referring to Fig. 1, the D.-C. multiplier system of this invention comprises a rectangular wave generator 6 coupled to a phase shifter 7 and a bidirectional modulator 8. Phase shifter 7 is adapted to receive a first D.-C. signal, $E_1$, and modulator 8 is adapted to receive a second D.-C. signal, $E_2$. The outputs of both the phase shifter 7 and modulator 8 are connected to a phase sensitive demodulator 9.

The operation of the above described system is as follows: Phase shifter 7 responds to signal $E_1$ to develop an output rectangular wave which is shifted in phase with respect to the rectangular wave from generator 6 by an amount depending upon the magnitude and polarity of signal $E_1$. Modulator 8 develops an output rectangular wave which is effectively modulated by an amount depending upon the magnitude and polarity of signal $E_2$ and is in phase, or 180° out of phase, with the rectangular wave from generator 6. Demodulator 9 responds to the output from phase shifter 7 to gate the output wave from modulator 8 thereby deriving a resultant rectangular wave which is a measure of the product of the D.-C. signals, $E_1$ and $E_2$. A preferred circuit arrangement to insure accurate development of the resultant rectangular wave is illustrated in Fig. 2.

Figure 2:
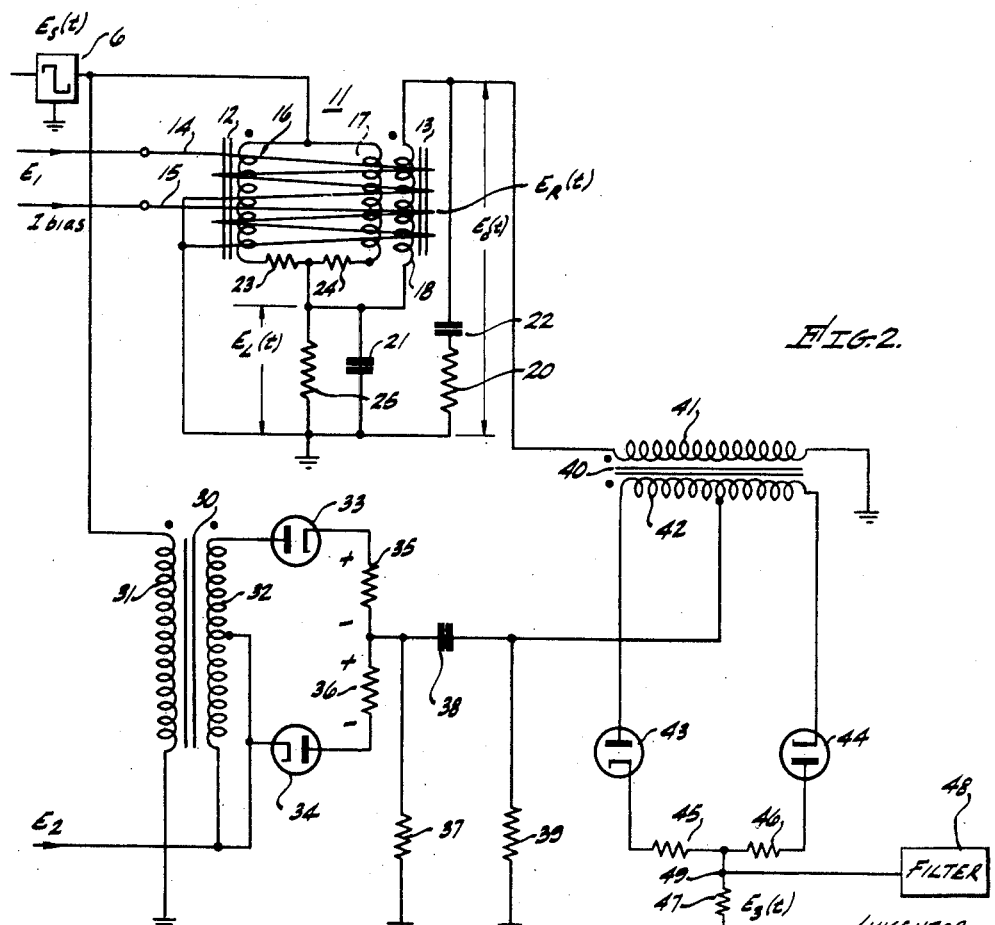
Fig. 2 is a schematic diagram showing a preferred circuit arrangement for the system shown in Fig. 1.

Referring to Fig. 2, a high gain magnetic amplifier is provided for transmitting the first D.-C. signal $E_1$ into an alternating waveform which has the same frequency as the rectangular wave from generator 6 and which bears a phase relationship relative thereto which is selectively adjustable. This amplifier has stable performance characteristics for achieving accurate phase control and comprises a saturable core reactor or phase control reactor assembly 11. Reactor 11 employs two saturable cores 12 and 13, a bias winding 15, a phase control winding 14 and three controlled windings 16, 17, and 18. The pairs of windings 14, 15 and 16, 17 are each connected in parallel. Controlled winding 17 is further employed as the primary, and winding 18 as the secondary, of a transformer wherein the core 13 couples winding 18 to winding 17. The bias and phase control windings 15, 14 are wound about cores 12, 13 so that the impedance of windings 16, 17 will be a function of the D.-C. signal $E_1$ and the bias current, denoted as $I_{bias}$, supplied to winding 15. The controlled winding 16 is wound separately on core 12 and windings 17, 18 are wound on core 13.

The cores used in the saturable core reactor 11, and in all other devices in this invention containing magnetic cores requiring stable variable permeability characteristics, must have substantially narrow rectangular hysteresis loops, as shown in Fig. 3. Such cores are composed of a metallic material, preferably of iron-nickel composition. The compositions found to have the most desirable rectangular hysteresis loop are those having a nickel to iron percentage of between 45% to 50%, 65% to 68%, and 80%. These materials when processed in accordance with annealing procedures well-known in the art have a substantially rectangular shaped hysteresis curve. For example, an alloy of 65% nickel 35% iron, after annealing in a magnetic field has an almost perfect rectangularly shaped hysteresis loop. Further information concerning such magnetic materials is present in vol. 12, No. 10, page 88 of Tele-Tech Magazine published in 1953 by Caldwell-Clements, Inc., New York City, New York.

To insure the most satisfactory operation of the multiplying system of this invention, the cores 12, 13 are preferably of toroidal shape to insure a low reluctance path to the magnetic lines of flux and to substantially eliminate leakage and the effects of any external magnetic fields. Also, a pair of resistors 23 and 24 may be connected in series with windings 16 and 17 to dampen circulating currents.

The phase control reactor assembly 11 is serially connected with the alternating voltage source 6 and a load resistor 25. One terminal of winding 18 is connected to the junction of phase control reactor assembly 11 and load resistor 25. To compensate for distortion of the rectangular wave, by phase control reactor assembly 11, a series connected capacitor 22 and resistor 20 are connected across winding 18 and load resistor 25, and a capacitor 21 is connected in parallel with resistor 25.

The alternating voltage whose amplitude is proportional to the second D.-C. signal $E_2$ is obtained by means of a network which includes a transformer 30, poled as shown. The primary winding 31 of transformer 30 is coupled to generator 6. The secondary winding 32 of transformer 30 is provided with a center-tap connection to receive signal $E_2$. A pair of diodes 33, 34 are connected in series through a pair of resistors 35, 36, with the anode and cathode of respective diodes 33, 34 connected to the opposite ends of secondary winding 32. The junction of resistors 35, 36 is coupled to ground through a load resistor 37.

The demodulating circuit for combining the alternating signals representative of D.-C. signals $E_1$ and $E_2$ comprises a transformer 40, having windings 41 and 42 poled as shown. Secondary winding 42 is center-tapped, and the signal appearing across resistor 37 is applied through capacitor 38 to resistor 39 which is tied to said center tap. A series circuit including a pair of diodes 43 and 44, and a pair of resistors 45 and 46, is connected across the ends of secondary winding 42 in the manner above described for the modulator circuit. A load resistor 47 is connected between the junction of resistors 45 and 46 and ground. The alternating waveform controlled by $E_1$ is applied to winding 41, which is connected between one end of winding 18 and ground. As previously mentioned, the waveform controlled by $E_1$ is utilized as switching means for the waveform controlled by $E_2$, and a resultant alternating voltage is developed across resistor 47. This alternating voltage is fed into a low pass filter unit 48 to obtain its average value with an acceptable predetermined ripple component. This average value represents the product of the two direct current quantities $E_1$ and $E_2$. How the demodulator, phase control reactor assembly and modulator operate and cooperate to achieve the desired results will now be more clearly explained by the use of the waveforms shown in Figs. 4a–4g.

Referring to Figs. 4a–4g, the rectangular waveform of generator 6, denoted $E_s(t)$, is illustrated in Fig. 4a. Initially, the cores of the phase control reactor assembly, with its additional A.-C. winding on one core, are unsaturated, hence the impedances of the controlled windings are very high in comparison to resistor 19 and most of the generator voltage appears across said windings. The additional A.-C. winding is phased such that, when the cores are unsaturated, thereby acting as a low loss transformer, the voltage across its terminals is equal in magnitude to that of the square wave generator, but with a 180° phase reversal, as shown in Fig. 4b. At some later time in the generator voltage cycle, designated as $T_1$, in Fig. 4b, one of the cores, depending on the net flux in the cores, saturates and the impedance windings drop to a very low value, hereinafter referred to as zero because of the rectangular hysteresis characteristics of said cores. This effectively places a short circuit across winding 18. The voltage across the reactor assembly and hence across winding 18 drops quickly to zero and the entire generator voltage appears across load resistor 19, as shown in Fig. 4c. The output voltage, designated as $E_o(t)$, is taken between the terminal of winding 18 connected to winding 41 and ground, and is the sum of the load voltage and the reactor voltage, as shown in Fig. 4d.

The time, with respect to the generator voltage period, at which saturation occurs is determined both by the magnitude and signs of the D.-C. signal $E_1$ and the bias current flowing through winding 15. The current in the bias winding 15 is adjusted so that, in the absence of D.-C. signal $E_1$, the output voltage $E_o(t)$ is a rectangular wave in quadrature with the supply voltage, as shown in Fig. 4d. The phase angle of the output voltage can now be varied linearly from quadrature by the control current $E_1$, as shown in Fig. 4e. Whether this phase angle is lead or lag from the initial quadrature depends upon the polarity of the control current. Hence, the circuit described functions as a linear rectangular wave phase shifter.

In the amplitude modulator circuit, the amplitude of the source voltage is assumed to be much greater than the maximum amplitude of the signal voltage, that is $E_s >> E_2$. When $E_2=0$, no voltage will appear across resistor 37 because the center-tap of secondary winding 32 is effectively at ground potential, and conduction of diodes 33, 34 causes currents which are equal and opposite to flow through resistor 37 and the source impedance of $E_2$. The application of the rectangular wave and a D.-C. signal voltage, whether positive or negative, to transformer 30 causes one diode to conduct more than the other, depending upon the polarity of the D.-C. signal. Further, the signal at resistor 37 is clamped at a D.-C. level established by the D.-C. signal $E_2$. The capacitor 38 couples the resultant A.-C. voltage across resistor 39. This voltage has an amplitude and phase (with respect to the generator 6) directly proportional to the amplitude and polarity of the applied signal, and a frequency the same as that of the source voltage, as shown in Fig. 4f.

In the demodulator, assuming $E_o \gg E_2$, diodes 43 and 44, resistors 45, 46, and 47 again represent circuits functioning in the same manner as heretofore described in the discussion of the bidirectional modulator. Assuming $E_o(t)$ is exactly in quadrature with the output voltage from the bidirectional modulator, i. e. $E_1=0$, the D.-C. component of the voltage across load resistor 47 is zero. When the phase of $E_o(t)$ is shifted from quadrature by the D.-C. signal $E_1$, as shown in Fig. 4e, a voltage $E_3(t)$, as shown in Fig. 4g, will be produced across a load resistor 47. Since the diodes conduct only when $E_o(t)$ is positive, the conduction period of $E_3(t)$, with respect to the source, will increase or decrease with a change in phase of $E_o(t)$ as produced by $E_1$. The amplitude of the voltage across load resistor 47 is that of the output of the bidirectional modulator and is therefore proportional to $E_2$. Hence the voltage time area of $E_3(t)$ represents the product of the two direct current signals. This resultant waveform may be fed into other circuitry for obtaining its direct current component only, such as filter unit 48.

While there has been here described one embodiment of the present invention, it will be manifest to one skilled in the art that various changes and modifications may be made therein without departing from the spirit of the invention. It is therefore aimed in the appended claims to cover all such changes and modifications as fall within the spirit and scope of the invention.

What is claimed is:

1. A D.-C. multiplier comprising a saturable core reactor device, respective means adapted to apply a constant frequency A.-C. signal and a first D.-C. signal to said device, said device being operative to develop a first alternating signal of said constant frequency which bears a phase relation to said A.-C. signal proportional to said first D.-C. signal with appropriate algebraic sign corresponding to the D.-C. polarity of said signal; a modulator, respective means adapted to apply said A.-C. signal and a second D.-C. signal to said modulator, said modulator being operative to develop a second alternating signal having a magnitude proportional to the magnitude of said second D.-C. signal with appropriate algebraic sign corresponding to the D.-C. polarity of said signal; a demodulator, respective means adapted to apply said first and second alternating signals to said demodulator, said demodulator being operative to develop a resultant alternating signal having an average value proportional to the product of said first and second D.-C. signals, said product being correct in algebraic sign denoted by D.-C. polarity.

2. A D.-C. multiplier for utilizing the output of an A.-C. voltage source and first and second D.-C. signals to develop a resultant signal which is proportional to the product of said D.-C. signals, said D.-C. multiplier comprising a phase shifting network, said network including a saturable core reactor, the core of said reactor having a substantially rectangular hysteresis loop characteristic, respective means coupled to said reactor adapted to apply said A.-C. voltage and said first D.-C. signal to said reactor, an output circuit for said reactor, the characteristics of said core being effective to cause a first A.-C. signal to be developed in said output circuit which is shifted in phase with respect to said A.-C. voltage an amount proportional to the magnitude and polarity of said first D.-C. signal; a modulator, respective means coupled to said modulator adapted to apply said A.-C. voltage and said second D.-C. signal to said modulator, said modulator being responsive to said A.-C. voltage and said second D.-C. signal to develop a second A.-C. signal having an amplitude proportional to said second D.-C. signal, said second A.-C. signal being in phase or 180° out of phase with said A.-C. voltage said phase being determined by the polarity of said second D.-C. signal; and a demodulator, said demodulator being coupled to said output circuit of said reactor and to said modulator, said demodulator being responsive to said first and second A.-C. signals to develop a resultant A.-C. signal the D.-C. component of which is proportional to the product of said first and second D.-C. signals.

3. The D.-C. multiplier as defined in claim 2 wherein said core of said saturable core reactor supports an A.-C. reactance winding and a D.-C. saturation winding, and said output circuit includes a resistive load, the A.-C. voltage appearing across said resistive load after said core becomes saturated.

4. The D.-C. multiplier as defined in claim 3 wherein the D.-C. saturation winding supported by said core of said saturable core reactor has means coupled to it for establishing a predetermined initial flux density in said core, and wherein said output circuit further includes signal translating means coupled to said A.-C. reactance winding to produce an A.-C. voltage shifted 180° in phase with respect to the output of the A.-C. voltage source.

5. The D.-C. multiplier as defined in claim 2, wherein said saturable core reactor comprises a pair of cores of magnetic material having a substantially rectangular hysteresis loop characteristic, a control winding serially wound about said cores, means adapted to apply a biasing direct current to said control winding for predetermining the initial flux density of said cores, means adapted to apply said first D.-C. signal to said control winding for predetermining the instant of time saturation will occur in the alternating voltage cycle, a pair of controlled windings inductively coupled to the respective cores, said controlled windings being connected in parallel; and said output circuit comprises a transformer, one of said controlled windings being the primary winding of said transformer, a secondary winding for said transformer, said secondary being poled to produce a 180° phase shift of the voltage across said primary winding, one terminal of said secondary winding being connected to said paralleled control windings; a load resistor connected between said paralleled controlled windings and ground, and said paralleled controlled windings and said load resistor are serially connected with said alternating voltage source, said saturable core reactor and said load resistor cooperating to produce an A.-C. waveform having a phase with respect to said A.-C. voltage source period directly proportional to said first D.-C. signal.

6. A D.-C. multiplier comprising an A.-C. voltage source; a saturable inductive device including a pair of cores of magnetic material having substantially rectangular hysteresis loop characteristics, a control winding serially wound about said cores, means to apply a first D.-C. signal to said control winding for predetermining the instant of time saturation will occur in the alternating voltage cycle, means coupled to said cores for applying an initial flux density to said cores, a controlled winding inductively coupled to the respective cores, said controlled windings being connected in parallel; a first transformer, one of said controlled windings being the primary winding of said first transformer, a secondary winding inductively coupled to said primary so as to produce a 180° phase shift of the voltage across said primary winding and having one of its terminals connected to said paralleled controlled windings; a first load resistor connected between said paralleled controlled windings and ground, said saturable inductive device and first load resistor being serially connected to said alternating voltage source and cooperating to produce a first A.-C. signal having a phase with respect to said A.-C. source directly proportional to said first D.-C. signal; a modulator, respective means coupled to said modulator adapted to apply said A.-C. voltage and a second D.-C. signal to said modulator, said modulator being responsive to said A.-C. voltage and said second D.-C. signal to develop a second A.-C. signal having an amplitude proportional to said second D.-C. signal, said second A.-C. signal being in phase or 180° out of phase with said A.-C. voltage, said phase being determined by the polarity of said second D.-C. signal; and a demodulator, said demodulator being coupled to said saturable inductive device and to said modulator, said demodulator being responsive to said first and second A.-C. signals to develop a resultant A.-C. signal, the D.-C. component of which is proportional to the product of said first and second D.-C. signals.

References Cited in the file of this patent

UNITED STATES PATENTS

| 2,105,849 | Usselman | Jan. 18, 1938 |
| 2,140,769 | Schienemann | Dec. 20, 1938 |

FOREIGN PATENTS

| 113,285 | Australia | June 9, 1941 |